June 23, 1953 — P. G. VANNI — 2,642,855
PNEUMATIC GOVERNOR FOR COMPRESSION IGNITION ENGINES
Filed April 2, 1952
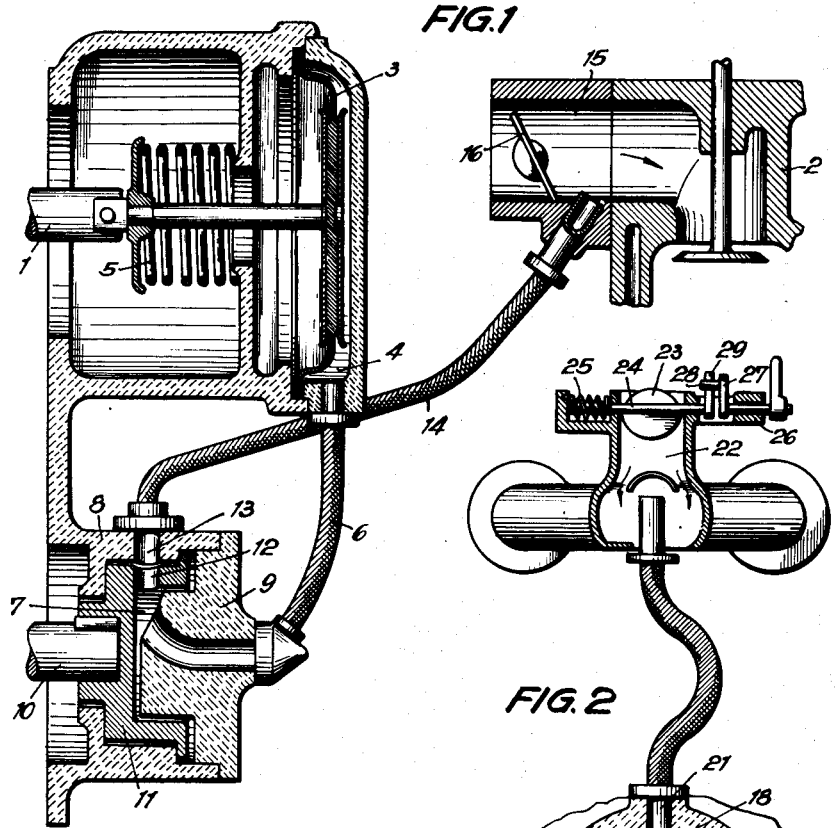
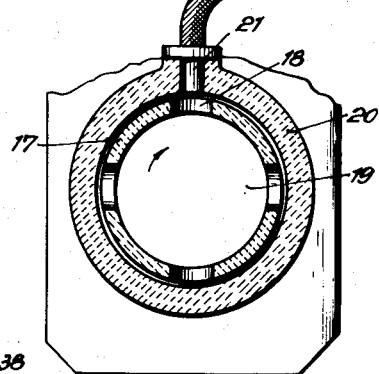
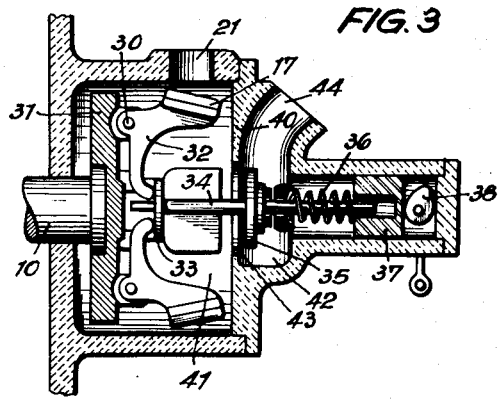
INVENTOR
Pier G. Vanni
by
Stevens, Davis, Miller & Mosher
his attorneys Patented June 23, 1953

2,642,855

UNITED STATES PATENT OFFICE 2,642,855

PNEUMATIC GOVERNOR FOR COMPRESSION IGNITION ENGINES

Pier Giorgio Vanni, Milan, Italy, assignor to Robert Bosch G. m. b. H., Stuttgart, Germany Application April 2, 1952, Serial No. 280,151
In Italy April 4, 1951

14 Claims. (Cl. 123—140)

1

This invention concerns a pneumatic governor for compression ignition engines having an adjustable butterfly valve which is adjustable at will disposed in the induction manifold, and a regulating member, such as a diaphragm, actuated by the vacuum in the induction manifold and which is adapted to seal a regulating chamber connected with the induction manifold against the external air and to control the quantity of fuel supplied to the compression ignition engine. The known governors of this type operate with the medium or mean vacuum which is formed in the induction manifold of the compression ignition engine from the fluctuations of the vacuum during each complete cycle of the compression ignition engine.

The aim of this invention is to utilise the maximum vacuum arising in the induction manifold during a complete cycle of the engine, so that the regulating forces are increased without increasing the vacuum in the induction manifold at the same time, as this would have a detrimental effect on the engine. This is obtained, according to this invention, by the provision of a control member which is incorporated in the connection between the induction manifold and the governor chamber and which is adapted to maintain the connection open during the induction stroke or strokes of the piston or pistons of the compression ignition engine and, during the remaining strokes, to cut it off or to throttle it considerably at least in the region of high engine speeds. As is well known, the highest vacuum present in one complete cycle occurs in the induction manifold during the induction stroke.

A further development of this invention consists in that the control member is operated in timed relationship with engine speed, so that the governor at low speeds of the engine operates with the hitherto customary mean vacuum and operates only at high speeds with the aforementioned highest vacuum.

The invention is further described with reference to the accompanying drawings which illustrate three forms of the invention by way of examples only and in which—

Fig. 1 is a longitudinal section of the first example,

Fig. 2 a cross section of the second example, and

Fig. 3 a longitudinal section of the third example.

Referring first to Fig. 1 of the drawings the usual regulating rod 1—for varying the fuel supply quantity of a fuel injection pump, not shown

2 in the drawings, to the compression ignition engine which is shown in part at 2—is connected with a diaphragm 3 which, under the action of the vacuum existing in a regulating chamber 4, is adapted to displace the regulating rod 1 in the direction of the "stop" position against the resistance of a spring 5. The latter tends to displace the regulating rod in the direction of the "full supply quantity" position of the injection pump. A pipe 6 connects the chamber 4 with the inner chamber 7 of a distributor casing, consisting of the parts 8 and 9, in which rotates a control member 11 mounted on the cam shaft 10 of the injection pump. The control member 11 has a control opening 12 which, in the position shown, connects the chamber 7 with an opening 13 leading through the wall of the casing 8. Opening 13 is connected by a pipe 14 with the induction manifold 15 of the compression ignition engine. The compression ignition engine works with four strokes per cycle, consequently the cam shaft 10 of the injection pump rotates at half the crank shaft speed of the engine. The control opening 12 is so arranged that it assumes the position shown when the piston of the engine executes its induction stroke, therefore the maximum vacuum exists in the induction manifold 15 behind the butterfly valve 16 disposed therein.

This butterfly valve, which can be actuated at will and in a known manner, serves the purpose of adjusting or setting the governor for various engine speeds.

Fig. 2 shows an arrangement for a four cylinder four stroke engine.

In this case the control member 17 has four control openings 18 which effect the connection of the inner chamber 19 of the distributor casing 20 with the opening 21 at the particular moment when one of the pistons of the compression ignition engine executes an induction stroke and consequently produces the maximum vacuum in the induction manifold of the compression ignition engine.

In this case a butterfly valve 23 is mounted asymmetrically on its actuating shaft 24, in a known manner, in the induction manifold 22 of the engine, so that it tends to open under the action of the air stream drawn in by the engine. A spring 25 acts against this opening movement of the butterfly valve. An adjustment shaft 26 is provided coaxially with the shaft 24. A lever 27 carrying a pin 28 is mounted on the adjustment shaft. The lever 27 through its pin 28 is adapted to engage a lever 29 disposed on the shaft 24. The spring 25 tends to maintain the lever 29 in abutment with the pin 28.

The strength of the spring 25 is so arranged that the butterfly valve 23 is opened by the induced air only if the maximum vacuum necessary for actuating the governor has been exceeded. The necessary vacuum exceeded is for example when the engine is to be changed from a higher speed to a lower speed by closing the butterfly valve.

In certain cases, it may be an advantage to permit the mean vacuum to act on the governor at lower speeds of the compression ignition engine than is customary hitherto and, according to the invention, to use the maximum vacuum occurring during the induction stroke of the compression ignition engine only at higher speeds. In order to render this possible, the arrangement shown in Fig. 3 is chosen. In this example the controlling surface of the control member 17 does not consist of a rigid part, as is the case in the preceding examples, but of moveable part-segments 17. These segments serve the purpose of closing the control opening 21. They are suspended on pins 30 in the manner of pivotal centrifugal weights. These pins are carried by a disc 31 mounted on the cam shaft 10 of the injection pump. In their outward movement effected under the influence of the centrifugal force, the segments 17 engage, through their integral lever arms 32, on a disc 33 which is mounted on a bolt 34. The latter carries a second disc 35 which is subjected to the pressure of a spring 36 via a ball bearing. Spring 36 may be tensioned by means of a slide member 37 disposed in the distributor, and displaceable by means of a cam 38. In this example, the inner chamber of the distributor casing is divided into two chambers 41 and 42 by a wall 40 therethrough the disc 35 can reciprocate with a certain amount of clearance. The chamber 42 is connected with the regulating chamber 4 via an opening 44, for example, by a pipe such as that designated 6 in Fig. 1.

In the position shown in the drawing, the segments 17 do not close the opening 21, so that the governor operates with the mean vacuum at speeds of the compression ignition engine in which the segments approximately assume the positions shown in the drawing. With increasing engine speed, the segments 17 swing outwardly and starting from a definite high speed they assume a position in which they can close the opening 21 in the same manner as the control member 17 of Fig. 2. Starting from this speed therefore, the governor operates only with the highest vacuum occurring during a complete cycle of the compression ignition engine.

At very low speeds, the segments 17 assume a position closer to the axis of rotation, as compared with the position shown in Fig. 3. At the same time the disc 35 moves into the opening 43 under the action of the spring 36 and consequently throttles the communication between the chamber 41 and the chamber 42. Through this the considerable fluctuations of the vacuum arising at these low speeds are throttled and cannot be effective to their full extent as far as chamber 4 is concerned.

The slide member 37 can be displaced by adjustment of the cam 38 at will for altering the tension of the spring 36, so that the speed at which the desired effect, according to the invention, occurs can be adapted to suit requirements.

I claim:

1. In a pneumatic governor for compression ignition engines, including a connection between the governor and the induction system of the engine, the provision of a valve control member in said connection and means for actuating said valve control member in timed relationship with the engine so as to open said valve control member to connect the induction system of the engine with the governor during the induction stroke of at least one piston of the engine.

2. In a pneumatic governor for compression ignition engines, including a connection between the governor and the induction system of the engine, the provision of a valve control member in said connection and means for actuating said valve control member in timed relationship with the engine so as to open said valve control member to connect the induction system of the engine with the governor during the induction stroke of induction strokes of the piston or pistons of the engine.

3. In a pneumatic governor for compression ignition engines, including a regulating chamber sealed by a regulating member, such as a diaphragm, and a connection between the regulating chamber and the induction system of the engine, the provision of a valve control member in said connection and means for actuating said valve control member in timed relationship with the engine so as to open said valve control member to connect the induction system of the engine with the regulating chamber during the induction stroke or induction strokes of the piston or pistons of the engine.

4. In an internal combustion engine including an induction system, a fuel pump and a pneumatic governor for the fuel pump embodying a regulating chamber sealed by a regulating member, such as a diaphragm, and a connection between said regulating chamber and the induction system of the engine, the provision of a valve control member in said connection and means for actuating said valve control member in timed relationship with the engine so as to open said valve control member to connect the induction system of the engine with the regulating chamber during the induction stroke or induction strokes of the piston or pistons of the engine.

5. In a pneumatic governor arrangement for compression ignition engines having an adjustable butterfly valve disposed in the induction manifold, means for actuating the butterfly valve at will, a regulating chamber associated with the governor, means forming a connection between said regulating chamber and said manifold, a regulating member, such as a diaphragm, actuated by the vacuum in the induction manifold and adapted to seal the regulating chamber against external air and which adjusts the quantity of fuel supplied to the engine, the provision of a valve control member in said connection and means for actuating said valve control member in timed relationship with the engine so as to open the connection between the induction manifold and the regulating chamber during the induction stroke or induction strokes of the piston or pistons of the engine and to throttle it substantially during the other strokes.

6. In a pneumatic governor arrangement according to claim 5, a rotary valve control member in said connection and adapted to be driven by said compression ignition engine.

7. In a pneumatic governor arrangement according to claim 5 an actuating shaft, said butterfly valve being mounted asymmetrically on said actuating shaft, a spring connected with said butterfly valve and adapted to resist opening movement thereof, and the strength of the spring being such as to permit the butterfly valve to open as soon and as long as the vacuum is greater than is required for actuation of the governor.

8. In a pneumatic governor for compression ignition engines, including a regulating chamber sealed by a regulating member, such as a diaphragm, and a connection between the regulating chamber and the induction system of the engine, the provision of a rotary valve control member in said connection and means for driving said rotary valve control member in timed relationship with the engine so as to open said rotary valve control member to connect the induction system of the engine with the regulating chamber during the induction stroke or induction strokes of the piston or pistons of the engine.

9. In an internal combustion engine including an induction system, a fuel pump and a pneumatic governor for the fuel pump embodying a regulating chamber sealed by a regulating member, such as a diaphragm, and a connection between said regulating chamber and the induction system of the engine, the provision of a rotary valve control member in said connection and means for driving said valve control member in timed relationship with the engine so as to open said valve control member to connect the induction system of the engine with the regulating chamber during the induction stroke or induction strokes of the piston or pistons of the engine.

10. In an internal combustion engine including an induction system, a butterfly valve in said induction system, means for actuating said butterfly valve at will, a fuel pump and a pneumatic governor for the fuel pump embodying a regulating chamber sealed by a regulating member, such as a diaphragm, and a connection between said regulating chamber and the induction system of the engine, the provision of a valve control member in said connection and means for actuating said valve control member in timed relationship with the engine so as to open said valve control member to connect the induction system of the engine with the regulating chamber during the induction stroke or induction strokes of the piston or pistons of the engine.

11. In a pneumatic governor arrangement according to claim 10, an actuating shaft, said butterfly valve being mounted asymmetrically on said actuating shaft, a spring connected with said butterfly valve and adapted to resist opening movement thereof, and the strength of the spring being such as to permit the butterfly valve to open as soon and as long as the vacuum is greater than is required for actuation of the governor.

12. In a pneumatic governor arrangement, for compression ignition engines, embodying a regulating chamber sealed by a regulating member, such as a diaphragm, and a connection between said regulating chamber and the induction system of the engine, the provision of a rotary control member, means for driving said rotary control member in timed relationship with the engine so as to open said rotary control member to connect said induction system with the regulating chamber during the induction stroke of at least one piston of the engine, and control means actuated in response to engine speed and combined with said rotary control member to modify the opening of said rotary control member at high engine speeds.

13. In a pneumatic governor arrangement according to claim 12 the provision of a throttle member incorporated additionally in the connection leading from the induction system to the regulating chamber, and means associated with said throttle member to actuate the same in response to engine speed whereby to obtain a throttling effect in the connection at low engine speed.

14. In a pneumatic governor according to claim 12 in which said control means comprises segmental members pivoted to the rotary control member and adapted to be displaced by centrifugal action whereby to cause the rotary control member to become effective only at high engine speeds.

PIER GIORGIO VANNI.

References Cited in the file of this patent

UNITED STATES PATENTS

| Number | Name | Date |
|---|---|---|
| 2,012,998 | Junkers | Sept. 3, 1935 |